United States Patent [19]

Ansite

[11] Patent Number: 5,662,142
[45] Date of Patent: Sep. 2, 1997

[54] VALVE FLAPPER WITH BANDS OF DIFFERENT DEFLECTIBILITY

[75] Inventor: William K. Ansite, Glendale, Calif.

[73] Assignee: Gentex Corporation, Rancho Cucamonga, Calif.

[21] Appl. No.: 526,801

[22] Filed: Sep. 11, 1995

[51] Int. Cl.$^6$ .................................... F16K 15/14
[52] U.S. Cl. ...................... 137/854; 92/104; 92/105
[58] Field of Search ........................ 137/854, 852; 92/104, 105

[56] References Cited

U.S. PATENT DOCUMENTS

| | | | |
|---|---|---|---|
| 2,646,063 | 11/1953 | Hayes | 92/104 |
| 2,687,146 | 8/1954 | Ferguson | 92/104 |
| 2,777,464 | 3/1957 | Mosley | 137/854 |
| 2,936,779 | 5/1960 | Kindred | 137/854 |
| 3,085,591 | 4/1963 | Schneider | 137/859 |
| 4,838,262 | 6/1989 | Katz | 137/854 |
| 4,987,740 | 1/1991 | Coleman | 92/104 |
| 5,231,982 | 8/1993 | Harrison et al. | 137/854 |
| 5,384,928 | 1/1995 | Khoury | 137/854 |

Primary Examiner—Denise L. Ferensic
Assistant Examiner—Joanne Y. Kim
Attorney, Agent, or Firm—Donald D. Mon

[57] ABSTRACT

A circular valve flapper for an unidirectional gas flow system, such as a breathing system. It has a central support an edge seal adapted to bear against a valve seat to stop the flow, and retract from the valve seat to permit flow. The flapper includes four concentric annular bands, the first being continuous with the support. The first and third bands are readily deflectable, and the second and fourth bands are relatively stiff. One, and preferably both, of the first and third bands are rolling diaphragms. The readily deflectibility of the first and third bands results in a substantial axial deflection of the edge seal, and a reduction of low frequency noise.

5 Claims, 4 Drawing Sheets

VALVE FLAPPER WITH BANDS OF DIFFERENT DEFLECTIBILITY

SPECIFICATION

1. Field of the Invention

A circular valve flapper principally useful in pressure breathing systems having a plurality of coaxial bands which provide different deflectibilities in order to reduce flutter and assure closure of the valve against reverse flow at low back pressures, and when in various orientations relative to the vertical.

2. Background of the Invention

In most breathing systems that include an oral/nasal mask or a full face mask, the technique for directing breathing gas flow is to use an elastomeric check valve. The elastomeric check valve is often called an inlet valve flapper, or an exhalation valve flapper, depending or whether the flow of breathing gas is toward or away from the user. In a strictly "demand" system or "constant" flow system, conventional check valves are adequate. In the more complex "pressure-demand" systems the exhalation valve must be compensated closed so that the user will receive the benefit of gas supplied to the mask at pressures greater than ambient.

The inlet valve flapper has problems of its own. This invention principally relates to the design of an inlet valve flapper for inhalation valves, but the same principles can be applied to outlet valve flappers for exhalation valves.

The design of an inhalation valve having a flapper that uses a single rolling diaphragm type bead is well known art. The audible frequency noise generated by this type or by similar type flappers is well known.

The design of an optimal flapper to be used in an inhalation valve should meet the following criteria:

1. It should have an extremely low "cracking", or opening pressure differential, which also involves a minimized restoring force to return the valve to its closed condition.
2. It should cause only a low pressure drop (flow resistance) at high inspiration rates.
3. It should permit only extremely low "back flow leakage" at very low back pressures; ideally it should be zero back flow leakage.
4. It should have sufficient physical integrity to restrict back flow leakage to zero or at least to a minimum when subjected to high back pressures.
5. The pre-load of the flapper onto the valve seat should be optimized so that all the above objectives are realized even when the valve is in the inverted position. The term "inverted" describes the orientation of the valve when gravity or centrifugal force tends to open the valve, as opposed to the normal position when these forces tend to close the valve.

As with many engineering designs, many of these objectives require judicious compromise. For example, the design for minimum "cracking" pressure may mean zero pre-load, and thus the flapper might not meet the "back flow leakage" system requirements at low pressures, or when in the inverted position it may not close reliably. An excessive rate of back flow leakage could compromise the breathing system of which it is a part. As back pressure increases, the check valve is usually more effectively closed. Therefore the design must balance pre-load, restoring, and cracking pressures to a functional optimum.

However, it has been found that once a compromise has been reached between pre-load and cracking pressures, another condition influences the acceptance criteria. That condition may be described as the natural frequency of the flapper. The flapper tends to oscillate between opening and closing under low gas flows, which then means that the valve assembly will generate an audible (buzzing) sound particularly if the frequency is in resonance with the rest of the breathing system. The buzzing sound can be crudely related to the vibrating reed of a musical instrument. The stiffer and shorter the reed, the higher the tone. The lower the pre-load designed into a flapper, the lower the frequency of the buzz.

In an oral/nasal mask the inhalation (flapper) valve may be located next to the microphone with which the user (pilot) communicates to others. A buzzing sound may make electronic communication difficult, if not impossible. Low flow buzz may be described as the flapper opening and closing against the valve seat at an audible frequency. Occasionally the flapper flutters in the open position under very high inhalation flow conditions, but in this case the flapper is not beating itself against the valve seat. Therefore high flow flutter may be an annoyance, but the user is not talking at the same time. This disclosure concerns itself with the low-flow buzzing which is a definite nuisance and an impediment to effective voice communication.

In structures such as this flapper valve, its resonant frequency or frequency of vibration for a given set of conditions is directly proportional to the restoring force, and inversely proportional to its mass. By judicious arrangement of its mass and of its elements which contribute to the restoring force, a flapper valve is provided which is dynamic in its response to flow conditions such that the gas dynamics will cause one or the other of some sections of the flapper to move first, and to achieve a lower, less audible frequency of vibration when vibration occurs.

It is an object of this invention to provide a flapper type check valve which optimizes all of the above design criteria, and in particular which does not produce an audible low frequency flutter.

BRIEF DESCRIPTION OF THE INVENTION

A valve flapper according to this invention is utilized in a unidirectional flow system such as a breathing system. In such systems a plenum is provided surrounding the user's nose and mouth, or even the user's full face. The user withdraws breathing air or oxygen through an inlet port and exhausts it through an outlet port. Unidirectional check valves are provided in both of these ports. Their function is to permit flow in a forward flow direction and prevent it in a backward flow direction. A valve seat is provided in each port against which a valve flapper bears to close the valve at that seat.

According to this invention, the valve seat and valve flapper are circular. The valve flapper is concentric with the valve seat, and has a central axially extending stem. The valve flapper extends radially from the stem as a plurality of concentric annular sections or bands which have different deflectibilities. The outermost band includes a circular edge seal adapted to bear against the seat to seal the valve and prevent the passage of gas.

The first band is a rolling diaphragm adjacent to the stem.

The second band is a relatively stiff planar annulus.

The third band is either a rolling diaphragm or a thin flexible annulus whose deflectibility is much greater than that of the second band.

The fourth band is of the greatest stiffness, having a non-planar geometry with an edge on its outlet periphery that bears on the valve seat to close the valve.

The second and fourth bands are quite stiff. Axial movement of the edge seal results from deflection of one or both of the first and third bands.

According to a preferred but optional feature of the invention, the valve flapper is molded as a unitary body. The second and fourth bands are made relatively stiff. The third band is preferably more deflectable at lower flow rates than the first band due to its location, so that at low flow rates, the edge seal initially opens as the consequence of deflection of the first band and/or the third band. As the flow rate increases, the first band increasingly deflects, thereby further enlarging the gap between the edge seal and the seat.

In the preferred embodiment the third band is also a rolling diaphragm, because of all geometrical configurations it requires the least distortion or radial lengthening in order to deflect, and deflection can be basically axial. However, a very thin annular third band is also useful.

The above and other features of this invention will be fully understood from the following detailed description and the accompanying drawings, in which:

DETAILED DESCRIPTION OF THE INVENTION

Figure 1:
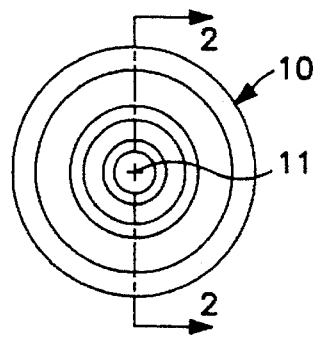
FIG. 1 is a plan view of the presently-preferred embodiment of the invention.

The presently preferred embodiment of a valve flapper 10 according to this invention is shown in FIG. 1. It is generally circular, and has a central axis 11. A central stem 12 is provided for attachment to supporting valve structure such as a spider or spike, or compensating tube.

The valve flapper will be described band-by-band. However, it will Generally be formed unitarily as a molded product. The different deflectibilities of the various bands will generally be provided by making their thicknesses and/or their geometry appropriately different from one another, although reinforcement material could, if desired be molded into the flapper.

Figure 2:
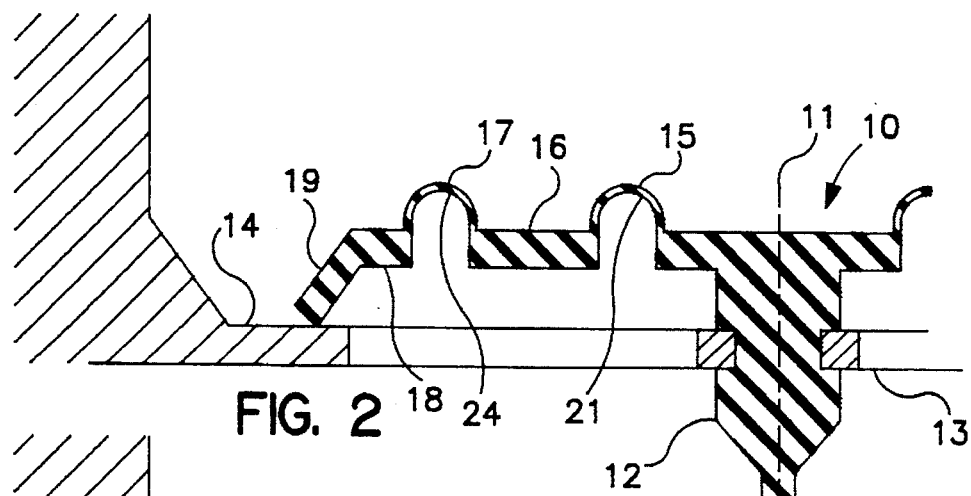
FIG. 2 is a one-half section taken at line 2—2 in FIG. 1, showing the flapper in its valve closed condition.
Figure 7:
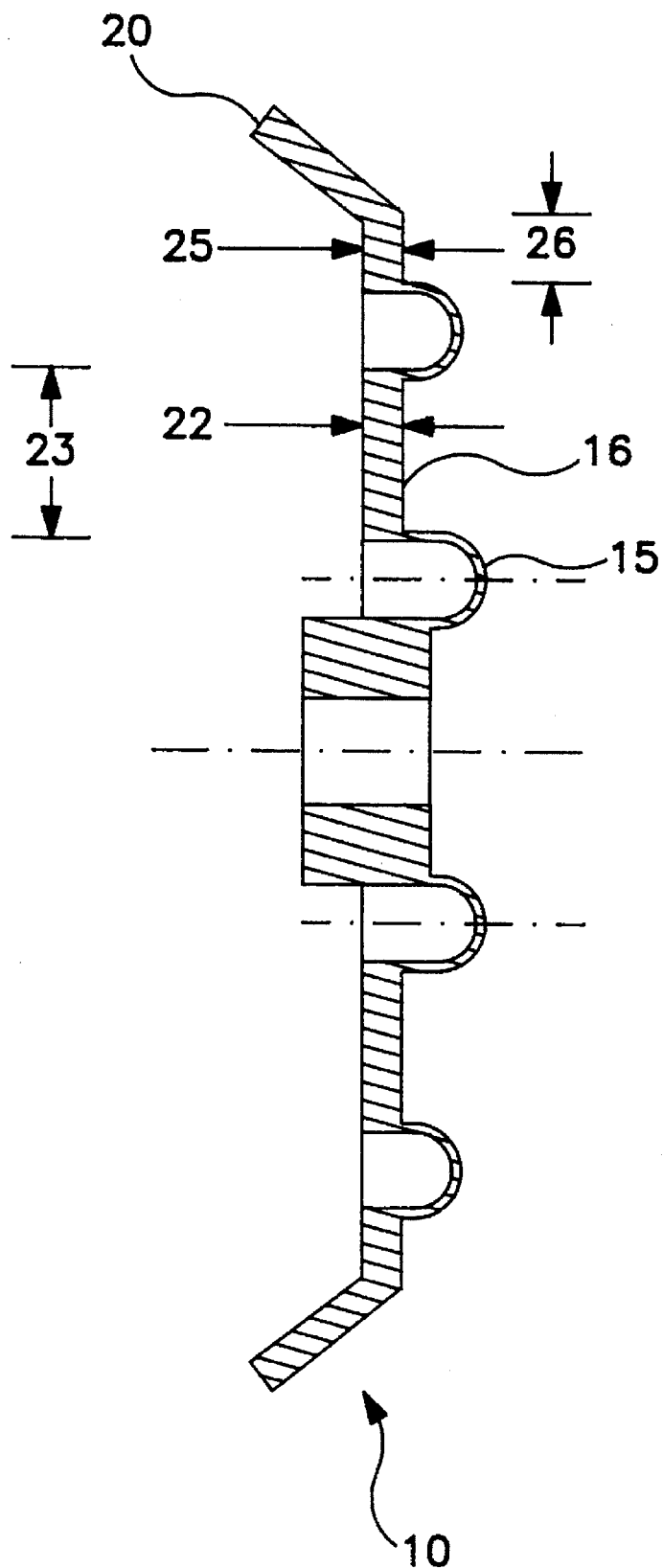
FIG. 7 is a dimensioned drawing of the embodiment of FIGS. 1 and 2.

The presently-preferred embodiment of the invention is shown in FIGS. 1, 2 and 7. It is shown as an inlet port valve flapper 10 to be used at the inlet port of a face mask (not shown). It is a unitary elastomeric body, preferably formed in a single piece by a molding process.

Flapper 10 has a central axis 11 and a central stem 12. The stem will be fixed to valve structure 13 to hold the flapper in its correct axial position relative to a valve seat 14. When the flapper edge seal bears against the seat, the inlet port will be closed (FIG. 2).

All bands to be described hereafter are concentric around the central axis. First band 15 interconnects the stem with a second band 16. Second band 16 interconnects band 15 to a third band 17. Third band 17 interconnects band 16 and a fourth band 18. A lip 19 is carried by band 18. It has an edge seal 20 on its periphery formed as a continuous circular surface normal to the central axis. Edge seal 20 will contact seat 14 to close the valve.

First band 15 is a rolling type diaphragm bead having an arch 21 opening upstream when installed.

Second band 16 is a flat disc having a dimension of thickness 22 and a radial width 23.

In this preferred embodiment, third band 17 is also a rolling type diaphragm bead, having an arch 24 which opens upstream when installed.

Fourth band 18 is a flat disc having a dimension of thickness 25 and a radial width 26.

Lip 19 tapers from the thickness of band 18 to a relatively sharp edge at lip seal 20.

Bands 16 and 18, and lip 19 are relatively rigid, and are not intended to distort significantly during operation of the flapper.

Figure 3:
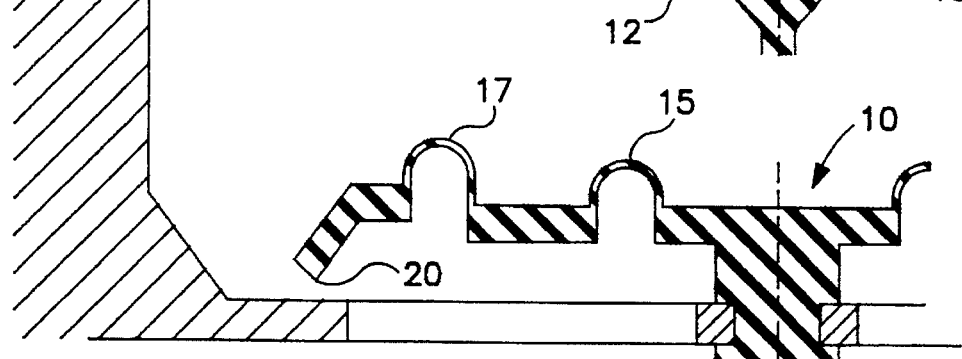
FIG. 3 is a view similar to FIG. 2 showing the flapper in its low flow rate condition.

Bands 15 and 17 are relatively and inherently deflectable. Bands 16 and 18 can move axially when their adjacent bands distort. Their relative deflectibilities are such that first band 15 is less readily distorted than third band 17. Accordingly, as shown in FIG. 3, a condition of low flow, band 17 will have enabled the lip and lip seal to move so as to create a gap 27 for flow at a low flow rate. Notice that the first and second bands 15 and 16 will not have changed shape. The axial deflection of the edge seal will have occurred because of the deflection of band 17. Accordingly, in order to create the desired gap for gas flow, a lesser differential pressure will be required than if the flapper were a flat disc, or if only the first band 15 were provided as in the prior art.

This arrangement also means that the edge seal makes a reliable closure when there is only a small or no back pressure on it, because the bands can be proportioned so as to hold the edge seal against the seat, while still permitting axial deflection of the lip when the flow rate is low.

Figure 4:
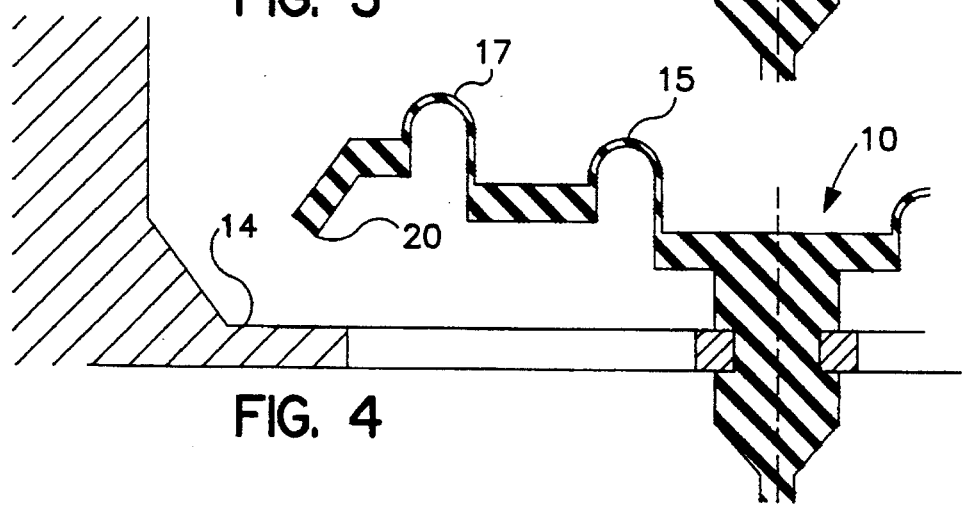
FIG. 4 is a view similar to FIG. 2 showing the flapper in its high flow rate condition.

As best shown in FIG. 4, when the flow rate is high a larger gap is required. First band 15 provides this, by enabling the second, third and fourth bands to move axially together to provide for some additional gap, and then fourth band 17 deflects even more. Accordingly the gap opens to its maximum, principally because of deflection of both of the two flexible bands.

Notice also that the movement of the edge seal does not involve tilting.

Figure 5:
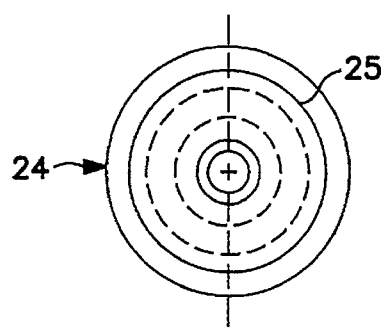
FIG. 5 is a plan view of another embodiment of the invention.
Figure 8:
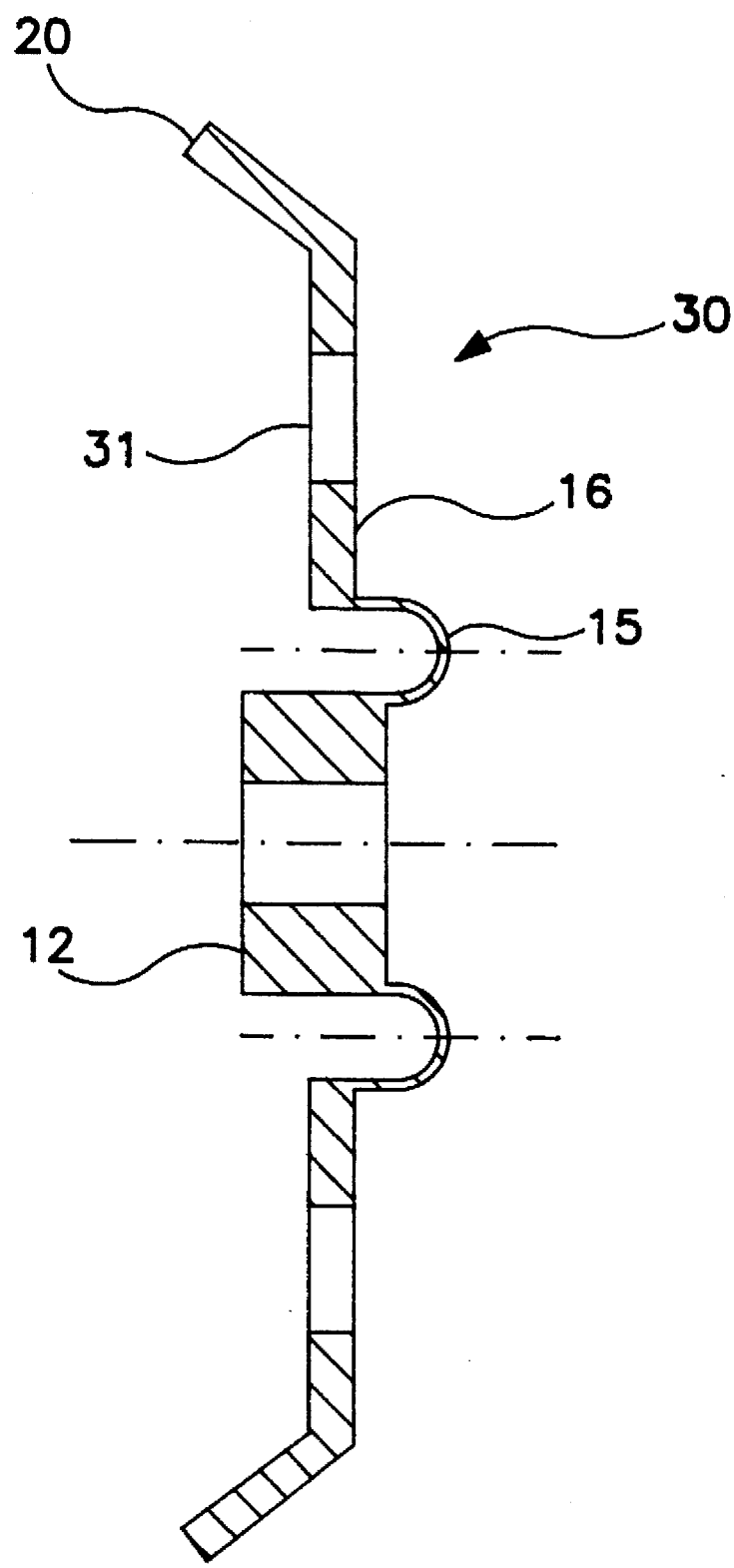
FIG. 8 is a dimensioned cross-section drawing of the embodiment of FIG. 5.

The valve flapper 30 shown in FIGS. 5 and 8 is identical to that of FIG. 1, and like numbers are used except for its third band 31. In this embodiment the third band is not a rolling diaphragm, but instead is a flexible disc. It has a lesser deflectibility than the bands on either side of it, just as in FIG. 1.

However, the initial opening at low flow results from distortion of band 31, by stretching or by bending out of plane, or by both acting as a hinge. The embodiment of FIG. 5 is less desirable than that of FIG. 1 because of the necessary distortion, and the movement of the lip seal out of a plane normal to the central axis, but it is still useful.

Figure 6:
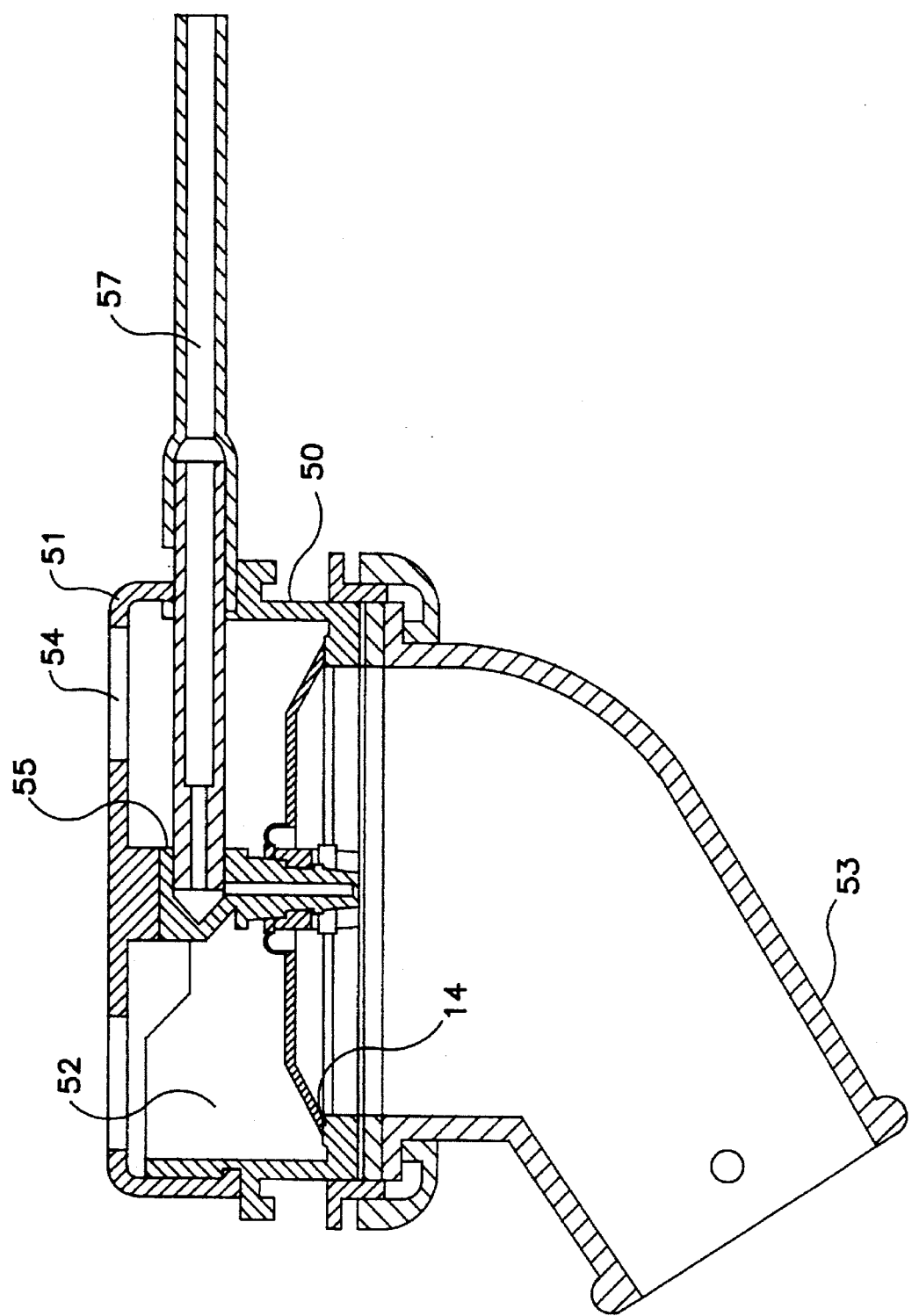
FIG. 6 is an axial cross-section of an inhalation valve installation according to the invention.

An installation suitable for either embodiment is shown in FIG. 6. Valve Body 50 carries seat 14, and with cap 51 forms a valve chamber 52. A hose coupling 53 is coupled to the body and communicates with the inlet port. The cap has ports 54 that permit flow to the user. A compensating tube 55 mounts the stem to the body. A sensing conduct 57 of no interest to this invention passes into the chamber and through the compensating tube.

Because this flapper valve in a flowing stream has the dynamic properties of a vibrating reed, its resonant frequency is a function of its mass and restoring force. The of a reed for a given set of conditions is given by the following well-known equations:

In these equations, T=cycle time, thus 1/T or f equals the resonant frequency.

M=Mass of the flapper which moves.

X=Deflection distance that the flapper moves.

F=Restoring force of the flapper (assumed constant for simplicity regardless of the deflection distance).

Accordingly, the resonant frequency varies directly with the restoring force and inversely with the mass.

By providing two relatively flexible bands (the first and third), and two relatively stiff bands (the second and fourth) and by appropriately distributing the mass by location of the bands among the various bands, the restoring force exerted by the edge seal on the fourth band is optimized, and the resonant frequency can be outside of the audible range.

In particular, the clever location of one flexible band to the other can cause each stiff band to have a different resonating frequency such that the sum of these frequencies will be a frequency outside of the audible range.

By providing the first band as a rolling diaphragm adjacent to the rigid second band, the forces needed to displace the second, third and fourth bands is minimized. A rolling band does not require radial elongation or out-of-plane deformation for such movement, and the "cracking" force is significantly minimized.

Also, when the first band is a rolling diaphragm, and the third band is a flat annulus instead of a rolling diaphragm, the planar surface on the third band can be located axially such that either the first or third band will move first. Then it is possible to design the flapper valve more precisely as to its "cracking pressure", and if desired a larger axial movement of the edge seal at a given "cracking pressure" may be attainable.

Because the deflection of the third band is relatively independent of deflection of the first band, a lower, less audible frequency is achievable.

Another problem solved by this invention is the tendency of exhaled gas to condense and collect on the flapper valve, and at very low temperatures to freeze. The use of two rolling diaphragms assures a wider opening of the valve, and their convex surfaces face downstream (the open concave surfaces face downstream). The resulting flow through opening of generous size, without concavity in the upstream surfaces, precludes collection condensation and freezing causing subsequent performance degradation. The term "upstream" means facing into coupling 53 from which the supply stream is received and the term "downstream" means facing into valve chamber 52.

FIGS. 7 and 8 are fully dimensioned drawings of the presently-preferred embodiments of the invention.

These valves are preferably made of silicone rubber, and the dimensions shown in FIGS. 7 and 8 are for valves made of this substance. Other elastomic material may be used instead, including natural latex rubber and butyl rubber, for example.

This invention is not to be limited by the embodiments shown in the drawings and described in the description, which are given by way of example and not of limitation, but only in accordance with the scope of the appended claims.

I claim:

1. A valve flapper for a valve comprising a unitary body of elastomeric material, said body being circular in plan view and having a central axis, a central stem for mounting the valve flapper, a first, second, third and fourth band in that order from said stem, said first band interconnecting said stem and second band, said second band interconnecting said first and third bands, and said third band interconnecting said second and fourth bands;

a lip on said fourth band;

an edge seal on said lip lying in a plane normal to said axis;

said first and third bands being inherently more deflectable and than either of said second and fourth bands, said second band and fourth bands being inherently stiffer than said first band and third band;

whereby upon exertion of sufficient gas pressure on the downstream facing face of said flapper, one of said first and third bands first deflects to provide a gap between said edge seal and a seat, without substantial deflection of said other bands, and upon the occurrence of a higher rate of gas flow, the other of said first and third bands deflects to increase said gap.

2. A valve flapper according to claim 1 in which said second band is a disc, and said first band is a rolling diaphragm bead forming an arch which faces upstream.

3. A valve flapper according to claim 2 in which said third band is a rolling diaphragm bead forming an arch which faces upstream.

4. A valve flapper according to claim 2 in which said third band is a disc, said third band being thinner than said second band.

5. A valve flapper according to claim 1 in which said lip is stiffer than any of said first, second and third bands.

* * * * *